(12) United States Patent
Chiba

(10) Patent No.: US 7,072,137 B2
(45) Date of Patent: Jul. 4, 2006

(54) DATA READ DEVICE, READ METHOD AND CIRCUIT CONTROLLING READ DEVICE

(75) Inventor: Hiroyuki Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 10/459,379

(22) Filed: Jun. 10, 2003

(65) Prior Publication Data

US 2003/0235098 A1  Dec. 25, 2003

(30) Foreign Application Priority Data

Jun. 11, 2002  (JP) .............................. 2002-170392

(51) Int. Cl.
*G11B 5/596* (2006.01)

(52) U.S. Cl. ..................... 360/77.06; 360/75

(58) Field of Classification Search .................. 360/31, 360/39, 48, 51, 53, 75, 77.06
See application file for complete search history.

(56) References Cited

U.S. PATENT DOCUMENTS

| 5,844,920 A | * | 12/1998 | Zook et al. ................. 714/769 |
| 6,043,946 A | * | 3/2000 | Genheimer et al. ........... 360/53 |
| 6,055,118 A | * | 4/2000 | Du .............................. 360/46 |

\* cited by examiner

*Primary Examiner*—David Hudspeth
*Assistant Examiner*—Jason Olson
(74) *Attorney, Agent, or Firm*—Greer, Burns & Crain, Ltd.

(57) ABSTRACT

An HDC asserts the read gate of an RDC when a read head is positioned in a sector located before a sector that a hot system instructs to read data when seen from the rotation direction of a storage medium. The data that the read head has read from the sector is used to adapt a circuit that constitutes the RDC. However, the data is not transferred to the host system. Such a process is repeated until the read head reaches a position where data stored in a sector whose data has been instructed to read can be read. In this way, time needed to adapt a circuit that constitutes a read channel can be shortened.

15 Claims, 8 Drawing Sheets

FIG. 1
(RELATED ART)

*1: FIR ADAPTATION CONTROL CIRCUIT
*2: VERTICALLY ASYMMETRICAL CORRECTION CIRCUIT
*3: AGC CONTROL CIRCUIT

FIG. 2
(RELATED ART)

IN THE CASE OF A, AN ERROR CAN BE CORRECTED BY ONE RETRIAL. HOWEVER, IN THE CASES OF B AND C, IT IS CORRECTED BY THREE RETRIALS AND SIX RETRIALS, RESPECTIVELY.

AT THE TIME OF FACTORY SHIPMENT
(THE PARAMETER OF EACH READ CIRCUIT CORRESPONDING TO EACH READ HEAD AND EACH DATA ZONE IS STORED IN MEMORY AND THE LIKE)

|  |  | DATA ZONE | | | | | | | | | |
|---|---|---|---|---|---|---|---|---|---|---|---|
|  |  | 0 | 1 | 2 | 3 | 4 | 5 | 6 | . | . | . |
| REPRODUCTION HEAD | 0 | p00 | p01 | p02 | p03 | p04 | p05 | p06 | . | . | . |
|  | 1 | p10 | p11 | p12 | p13 | p14 | p15 | p16 | . | . | . |
|  | 2 | p20 | p21 | p22 | p23 | p24 | p25 | p26 | . | . | . |
|  | 3 | p30 | p31 | p32 | p33 | p34 | p35 | p36 | . | . | . |
|  | . | . | . | . | . | . | . | . | . | . | . |
|  | . | . | . | . | . | . | . | . | . | . | . |
|  | . | . | . | . | . | . | . | . | . | . | . |

FIG. 8A

AN ERROR OCCURS IN A CELL WHOSE NUMBER OF A READ HEAD AND A DATA ZONE ARE 1 AND 2, RESPECTIVELY, AND THE ERROR IS CORRECTED BY A RETRIAL BY DUMMY READ.

WHEN A READ ERROR IS SUCCESSFULLY CORRECTED
(P12 IS REPLACED WITH P12NEW AND AFTER THIS TIME, P12NEW IS USED WHEN THE CELL WHOSE NUMBER OF A READ HEAD AND A DATA ZONE ARE 1 AND 2, RESPECTIVELY, IS READ)

|  |  | DATA ZONE | | | | | | | | | |
|---|---|---|---|---|---|---|---|---|---|---|---|
|  |  | 0 | 1 | 2 | 3 | 4 | 5 | 6 | . | . | . |
| REPRODUCTION HEAD | 0 | p00 | p01 | p02 | p03 | p04 | p05 | p06 | . | . | . |
|  | 1 | p10 | p11 | p12_new | p13 | p14 | p15 | p16 | . | . | . |
|  | 2 | p20 | p21 | p22 | p23 | p24 | p25 | p26 | . | . | . |
|  | 3 | p30 | p31 | p32 | p33 | p34 | p35 | p36 | . | . | . |
|  | . | . | . | . | . | . | . | . | . | . | . |
|  | . | . | . | . | . | . | . | . | . | . | . |
|  | . | . | . | . | . | . | . | . | . | . | . |

FIG. 8B

IN THE CASE WHERE A READ ERROR OCCURS IN A CELL WHOSE NUMBER OF A READ HEAD AND A DATA ZONE AREA 0 AND 5, RESPECTIVELY, AND THE ERROR CANNOT BE CORRECTED.

WHEN THE CORRECTION OF A READ ERROR FAILS (P05 IS NOT UPDATED)

|  |  | DATA ZONE | | | | | | | | | |
|---|---|---|---|---|---|---|---|---|---|---|---|
|  |  | 0 | 1 | 2 | 3 | 4 | 5 | 6 | . | . | . |
| REPRODUCTION HEAD | 0 | p00 | p01 | p02 | p03 | p04 | p05 | p06 | . | . | . |
|  | 1 | p10 | p11 | p12_new | p13 | p14 | p15 | p16 | . | . | . |
|  | 2 | p20 | p21 | p22 | p23 | p24 | p25 | p26 | . | . | . |
|  | 3 | p30 | p31 | p32 | p33 | p34 | p35 | p36 | . | . | . |
|  | . | . | . | . | . | . | . | . | . | . | . |
|  | . | . | . | . | . | . | . | . | . | . | . |
|  | . | . | . | . | . | . | . | . | . | . | . |

FIG. 8C

A READ ERROR OCCURS IN A CELL WHOSE NUMBER OF A READ HEAD AND A DATA ZONE ARE 3 AND 6, RESPECTIVELY, AND THE ERROR IS CORRECTED BY A RETRIAL BY DUMMY READ.

WHEN A READ ERROR IS SUCCESSFULLY CORRECTED
(P36 IS REPLACED WITH P36NEW, AND AFTER THIS TIME, WHEN THE CELL WHOSE NUMBER OF A READ HEAD AND A DATA ZONE ARE 3 AND 6, RESPECTIVELY, IS READ AGAIN, P36NEW IS USED.)

|  |  | DATA ZONE | | | | | | | | | |
|---|---|---|---|---|---|---|---|---|---|---|---|
|  |  | 0 | 1 | 2 | 3 | 4 | 5 | 6 | . | . | . |
| REPRODUCTION HEAD | 0 | p00 | p01 | p02 | p03 | p04 | p05 | p06 | . | . | . |
|  | 1 | p10 | p11 | p12_new | p13 | p14 | p15 | p16 | . | . | . |
|  | 2 | p20 | p21 | p22 | p23 | p24 | p25 | p26 | . | . | . |
|  | 3 | p30 | p31 | p32 | p33 | p34 | p35 | p36_new | . | . | . |
|  | . | . | . | . | . | . | . | . | . | . | . |
|  | . | . | . | . | . | . | . | . | . | . | . |
|  | . | . | . | . | . | . | . | . | . | . | . |

FIG. 8D

DATA READ DEVICE, READ METHOD AND CIRCUIT CONTROLLING READ DEVICE

BACKGROUND OF THE INVENTION

1. Field of the Invention

The present invention relates to a control method for controlling storage devices in such a way as to maximize their read performance according to a variety of environmental changes, and a retrial method used when data reading from a storage medium fails.

2. Description of the Related Art

With high-density storage of a magnetic disk device, the signal-to-noise ratio (S/N ratio) at the time of data reading has recently degraded. On the other hand, in order to correctly decode a read signal by a read head, an optimal modulation/demodulation method is adopted. Furthermore, the tuning of the parameters of a variety of read circuits, such as a pre-amplifier, the VGA (variable voltage amplifier) circuit of a read channel IC (hereinafter simply called a "read channel"), a filter control circuit and the like, is indispensable depending on the dispersion in characteristics of each read head and a magnetic disk medium.

However, even a device whose parameter is tuned at the time of shipment cannot avoid the change of recording performance due to the change of environmental temperature and the change in the clearance of a read head, and the degradation of a read margin due to output decrease due to the degradation of the read head and the like, which is a problem. In this case, a read margin indicates a probability of successful data reading. The higher the read margin, the lower the probability that an error will occur.

More specifically, when environmental temperature becomes higher or lower than room temperature or when the amount of clearance of a read head changes, the storage performance of a magnetic disk changes. As a result, even when a parameter is tuned before shipment, the read margin degrades in relation to the room temperature, and a read error easily occurs. If too much bias is applied to a read head or if a read head is too old, the performance of the read head degrades. In this case, the head output decreases and the read margin degrades. Therefore, in this case too, a read error easily occurs.

When the storage performance of the magnetic disk device degrades, in order to improve a read margin and to correct an error, an automatic adaptation function that is realized by a variety of filter circuits, signal reshaping circuits and the like that are built in a read channel on a data route is generally used at the time of data reading or read retrial. For an example of a circuit realizing the automatic adaptation function, an FIR (finite impulse response) adaptation control circuit, an asymmetrical correction circuit and the like are used.

In order to cope with output decrease due to the degradation of a read head, an AGC (auto gain control) circuit and the like make a VGA gain follow the current optimal value.

Figure 1:
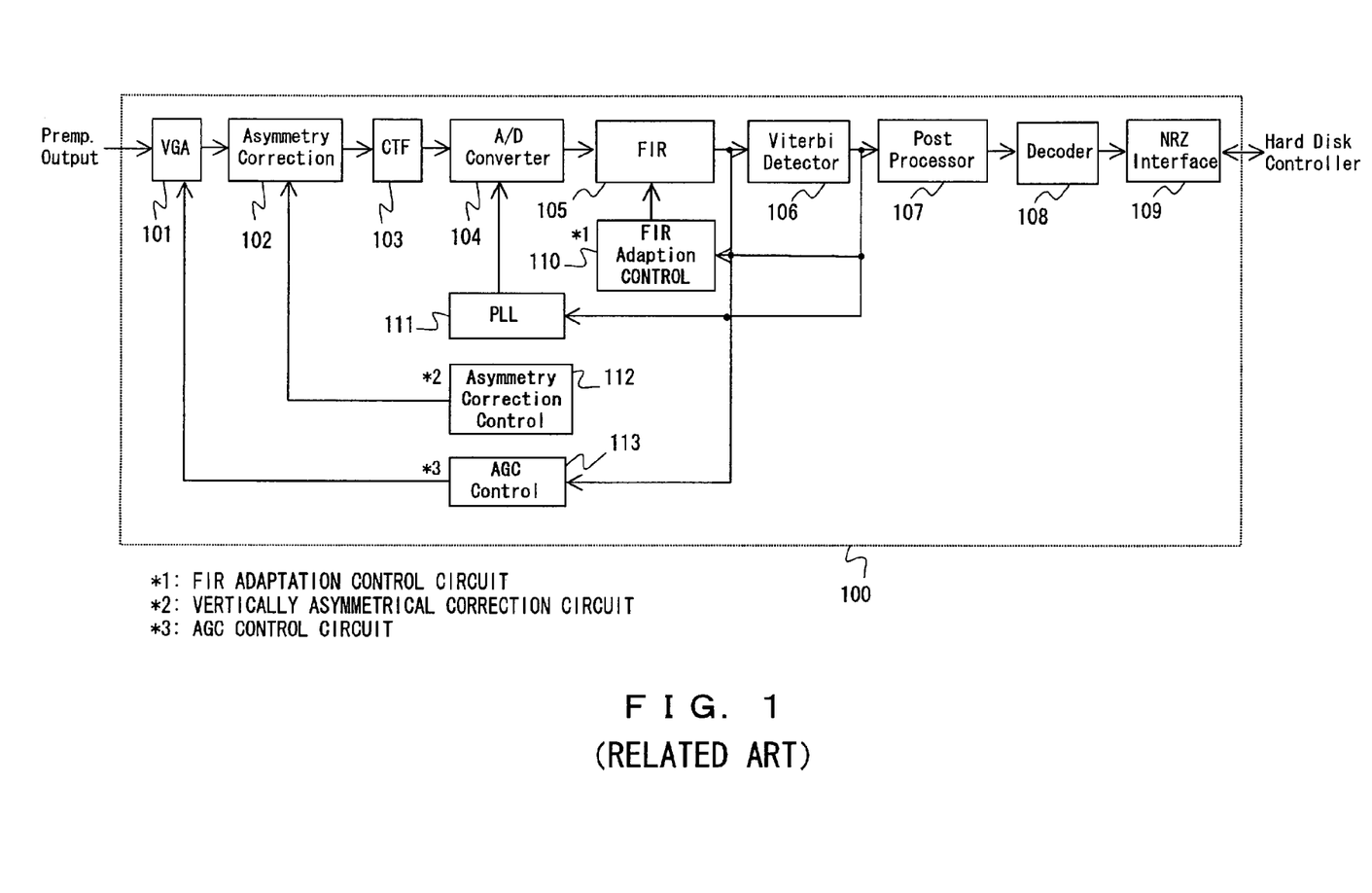
FIG. 1 shows an example of the configuration of a read channel.

FIG. 1 shows an example of the configuration of a read channel (RDC) with an FIR adaptation control circuit, an asymmetrical correction circuit and an AGC circuit. As shown in FIG. 1, a read channel 100 comprises a VGA (variable voltage amplifier) circuit 101, an asymmetrical correction circuit 102, a CFT (continuous time filter) circuit 103, an A/D (analog/digital) conversion circuit 104, an FIR circuit 105, a Viterbi detection circuit 106, a post-processor circuit 107, a decoder 108, a NRZ interface 109, an FIR adaptation control 110, a PLL (phase-locked loop) circuit 111, an asymmetrical correction control circuit 112 and an AGC circuit 113. Although in FIG. 1, a read channel adopting a PRML (partial response maximum likelihood) method is used as an example, this does not mean to restrict a method adopted by a read channel. In FIG. 1, although a Viterbi detector is used as an error correction circuit, another error correction circuit can also be used.

A pre-amplifier, which is not shown in FIG. 1, outputs an analog signal that is read from the storage medium of the magnetic disk device by a read head, to the VGA circuit 101.

The VGA circuit 101 amplifies an analog signal inputted from the pre-amplifier based on the output from the AGC circuit 113 and outputs it to the asymmetrical correction circuit 102. The gain of the VGA circuit 101 varies depending on the read head that is used to read data or whether a sector to be read is located within the inner circumference or outside the outer circumference of the magnetic disk.

The asymmetrical correction circuit 102 reshapes the waveform of the analog sign and outputs the reshaped signal to the CTF circuit 103 if there is a vertical asymmetry in the waveform. The CTF circuit 103 filters the inputted analog signal. The analog signal filtered by the CTF circuit 103 is converted into a digital signal by the A/D conversion circuit 104.

The FIR circuit 105 filters the inputted digital signal. The Viterbi detection circuit 106 obtains the most probable digital signal from the digital signals equalized by the FIR circuit 105. Then, demodulated data is obtained by demodulating the digital signal by the post processor circuit 107 and the decoder circuit 108. The demodulated data is outputted to a hard disk controller (HDC) through the NRZ interface 109.

Generally, a variety of parameters of the pre-amplifier, the VGA circuit 101, the asymmetrical correction circuit 102 the asymmetrical correction circuit 103, the A/D conversion circuit 104, and the FIR circuit 105 are optimized at the time of shipment. However, since each of the read margins of these circuits varies depending on the change of environmental temperature after shipment, head degradation and the like, the following circuits sometimes make the respective parameters of each read circuit and filter circuit follow the current optimal value.

The FIR adaptation control circuit 110 makes the filtering parameter of the FIR circuit 105 follow the current optimal value, based on the difference in output between the FIR circuit 105 and the Viterbi detection circuit 106.

The PLL circuit 111 makes the parameter for controlling the frequency of the output from the A/D conversion circuit 104 follow the current optimal value, based on the output from the error detection circuit 106.

The symmetrical correction control circuit 112 makes the parameter of the asymmetrical correction circuit 102 follow the current optimal value, based on the digital signal inputted from the FIR circuit 105.

The AGC circuit 113 compares the level of the digital signal inputted from the FIR circuit 105 with a prescribed level, and adjusts the gain of the VGA circuit 101 in such a way that the level of the signal inputted from the pre-amplifier becomes a desired value.

The RDC 100 can also be provided with a circuit making the parameter of the CTF circuit 103 follow an optimal value and the like, which are not shown in FIG. 1.

Figure 2:
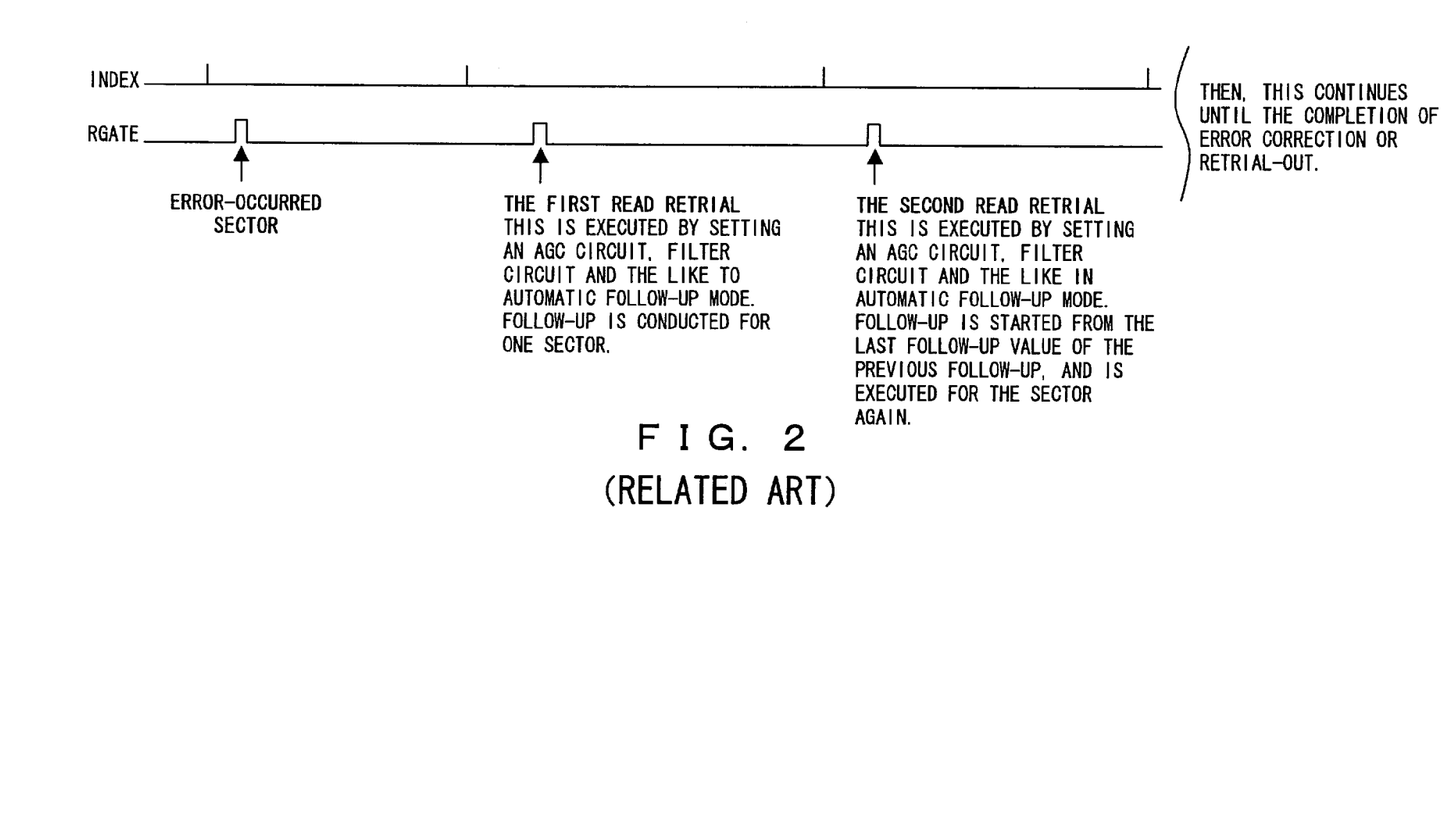
FIG. 2 shows how to correct an error according to the related art.

A conventional error correction method is described below with reference to FIG. 2. In FIG. 2, the horizontal axis indicates time. The upper section of FIG. 2 indicates an index pulse. An index pulse is outputted every time a magnetic disk makes one rotation, and indicates the number of rotations of the disk. The lower section of FIG. 2 indicates the assertion/negation of a read gate, that is, the opening/closing of a read gate.

As shown in FIG. 2, if the reading of the information written in a specific section fails, conventionally, the disk is rotated again at least once, and the read gate is asserted every time its read head reaches a sector position where the data that the read head has failed to read can be read. While the read gate is asserted, the read channel enters into a read mode, and a one time re-reading (read retrial) of the sector that has not been read is conducted. In this read retrial, each parameter of the read circuits and filter circuits that constitute a read channel is made to follow the current optimal value using a circuit realizing the auto follow-up function. If the n-th ("n" is an arbitrary natural number) read retrial fails, the disk is rotated at least one more time and the n+1-th read retrial is conducted. In the n+1-th read retrial, the follow-up operation is started from a parameter that is made to follow the current optimal value in the n-th read retrial.

By bringing each of the parameters of the read circuits and the filter circuits close to the current optimal value in this way, the error of a sector that has failed to be read is corrected. When the number of retrials or time spent in the retrial processes reaches an upper limit, the error cannot be corrected (retrial-out).

Figure 3:
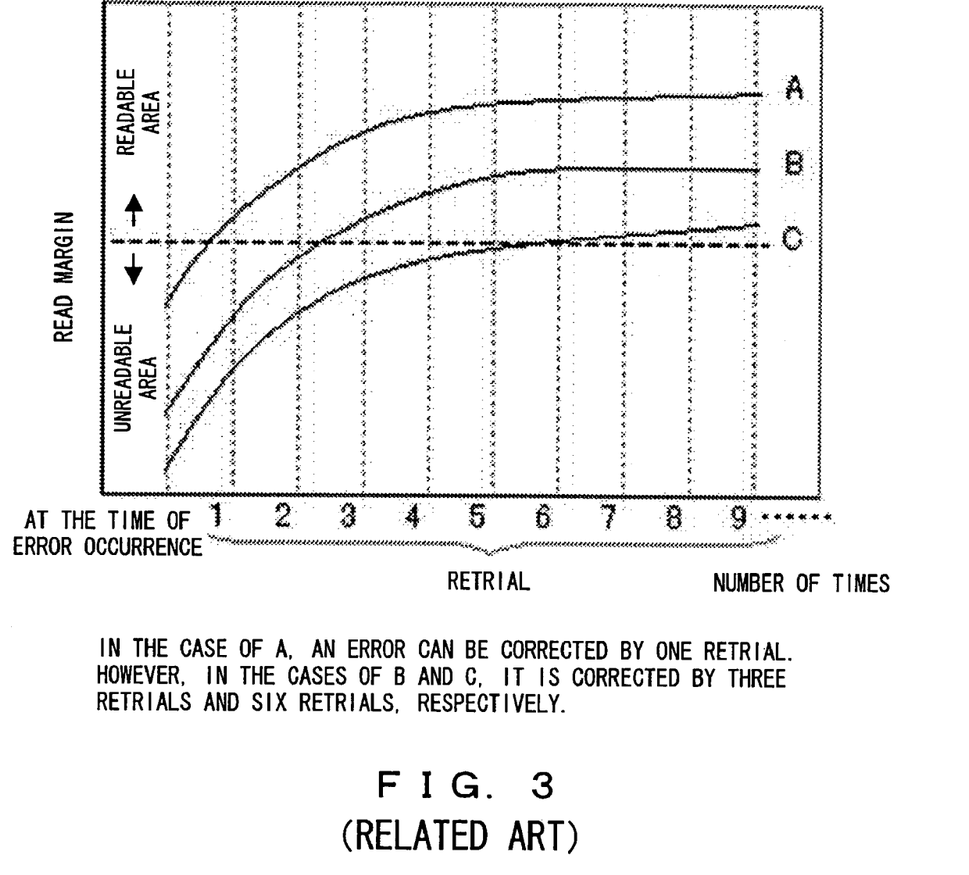
FIG. 3 shows how much time is needed to correct an error according to the related art.

Time needed to correct an error is described below with reference to FIG. 3. In FIG. 3, the horizontal and vertical axes indicate the number of retrials and a read margin, respectively. A dotted line indicates a level in which the probability that a read error will occur can be almost neglected. When a read margin goes beyond the dotted line, it means an error has been corrected. In other words, the higher the read margin, the lower the probability that an error will occur.

As shown in FIG. 3, the lower the read margin at the time of error occurrence, the greater the number of read retrials needed to complete an error correction. Specifically, three cases, A, B and C, shown in FIG. 3, are described below. In case A, where the read margin at the time of error occurrence is the highest, in other words, the difference between each current parameter of each read circuit and the current optimal value is not so big, an error correction is completed by one retrial. However, in case C, where the read margin at the time of error occurrence is the lowest, in other words, the difference between the current parameter of each read circuit and the current optimal value is big, six retrials are needed to complete the error correction.

Conventionally, a problem exists where a relatively long time is needed to make the parameter of each read circuit that constitutes a read channel follow the current optimal value using a circuit realizing the automatic adaptation function when the storage performance of a magnetic disk device degrades due to the change of environmental temperature or the like. Therefore, correct data read cannot be expected before a readable state is reached by making the parameter follow the current optimal value, and as a result, the number of read retrials is large. This means the degradation of the performance of the magnetic disk device. In the worst case, it also is the cause of the problem that an error could not be corrected even after the number of retrials or the processing time has reached the upper limit.

If there is a big difference between a tuning value and a current optimal value (that is, if there is big output decrease), there is also a problem where it takes a relatively long time to make a value obtained by tuning a VGA gain to follow the current optimal value before shipment using an AGC circuit and the like in order to cope with the decrease of head output due to the degradation of a read head. Therefore, in this case too, there is a problem where the number of read retrials became large or an error cannot be corrected.

The problems described above are not limited to the case where the storage medium is a magnetic disk, and may occur in the case where the storage medium is another type of disk, such as an optical disk, a magneto-optical disk, a magnetic tape or the like.

SUMMARY OF THE INVENTION

It is a first object of the present invention to shorten the time needed to adapt each circuit that constitutes a read channel to the change in environmental temperature or the change in the output of a read head. It is a second object to provide a read device in which a read error is difficult to occur.

According to one aspect of the present invention, a read device reading data recorded on a storage medium comprises a read unit reading data stored in the storage medium and a control unit controlling the read unit. The control unit controls the read unit in such a way as to adapt a circuit that constitutes the read unit using data read from the second sector of the storage medium, instead of a first sector that a host system has instructed to read data.

In this way, a circuit that constitutes the read unit can be adapted to the change in environmental temperature and the change in the output of a read head or the like, using the second sector, instead of the first sector. Conventionally, each parameter is made to follow the optimal value using data for one sector for each rotation. However, according to the present invention, each parameter can be made to follow the optimal value using data for a plurality of sectors for each rotation. Therefore, the amount in change of each parameter that can be made to follow for each rotation of a storage medium can be increased greater than before. As a result, time needed to adapt each circuit that constitutes a read channel to the change in environmental temperature or the change in the output of a read head can be shortened. For the storage medium, a magnetic disk, a magneto-optical disk, an optical disk or the like can be used.

In the configuration, the second sector can be in the vicinity of the first sector. If the function of the read unit degrades due to the change of environmental temperature or the degradation of a read head, there is a high possibility that a read error may occur as in the case of the first sector when data for the second sector in the vicinity of the first sector is read. This is because the data for the second sector in the vicinity of the first sector can be used to make the parameter of each circuit that constitutes the read unit to follow an optimal value.

In the configuration, alternatively, the control unit can do without transferring data read from the second sector to the host system. This is because the host system does not need the data read from the second sector.

In the configuration, alternatively, the control unit can read data stored in the first sector after each circuit that constitutes the read unit has been adapted to the change in environmental temperature or the degradation of a read head, using the adaptation result of a read circuit that is obtained after data from the second sector has been read. In this way, the read error of data recorded on the first sector can be greatly reduced.

In the configuration, alternatively, each circuit that constitutes the read unit can be adapted to the change in environmental temperature or the degradation of a read head, using the adaptation result of a read circuit that is obtained after data from the second sector has been read, if the read of data stored in the first sector has failed. In this way, the number of retrials at the time of read retrial can be reduced.

The read device can further comprise a temperature detection unit detecting environmental temperature or temperature in the device. In this case, if the temperature detection unit detects temperature change that meets prescribed conditions, the control unit can make each circuit that constitutes the read unit adapt itself to the temperature change before the read unit reads data stored in the first sector. Alternatively, the read device can further comprise a head output detection unit detecting the output of a read head that reads data from the storage medium. In this case, if the head output detection unit detects output change that meets prescribed conditions, the control unit can make each circuit that constitutes the read unit adapt itself to the output change before the read unit reads data stored in the first sector.

In this way, so that there is no read error, even when there is a high possibility that one may occur, each circuit that constitutes the read unit can be automatically adapted to the change in environmental temperature or the output change of a read head.

Alternatively, the read device can further comprise a storage unit storing the setting value of each circuit that constitutes the read unit. In this case, the control unit can update the setting value stored in the storage unit, based on the result of adapting each circuit that constitutes the read unit to the change in environmental temperature or the output change of a read head. Each circuit that constitutes the read unit is most often adapted to the change in environmental temperature or the output change of a read head. Environmental temperature seldom changes rapidly and greatly. Once a read head degrades, it is difficult to restore it to its original state. Therefore, by modifying the setting value of each of these circuits, based on the result of adapting each circuit that constitutes the read unit to the change in environmental temperature or the output change of a read head, errors can be greatly reduced when subsequent data is read. The storage unit can be a part of the storage medium or memory provided for the read device.

A storage device provided with the read device can also solve the problems.

Another aspect of the present invention is an adaptation method for adapting a read unit reading data recorded on a storage medium. This includes receiving the instruction to read data stored in the first sector of the storage medium from a host system and adapting a circuit that constitutes the read unit using data read from a second sector, instead of a first sector. This adaptation method can also solve the problems.

Another aspect of the present invention is a circuit that controls the read device reading data recorded on a storage medium. This circuit comprises a transfer unit transferring read data to a host system, and a signal output unit outputting a signal asserting the read gate of a read unit reading data. If a read head is positioned in a place where data for the second sector located before the first sector of the storage medium that the host system has instructed the read unit to read data when seen from the rotation direction of the storage medium, the signal output unit outputs a signal asserting the read gate. The transfer unit does not transfer the data read from the second sector to the host system. By providing this circuit for the read device or also for the storage device too, the problems can be solved.

BRIEF DESCRIPTION OF THE DRAWINGS

The features and advantages of the present invention will be more clearly appreciated from the following description taken in conjunction with the accompanying drawings in which like elements are denoted by like reference numerals and in which:

FIG. 8A shows a parameter table set at the time of shipment;

FIG. 8B shows a parameter table which is modified based on the result of error correction for an error that occurred at a specific time;

FIG. 8C shows a parameter table when the correction of an error that fails occurs after the parameter table shown in FIG. 8B has been obtained; and FIG. 8D shows a parameter table which is modified based on the result of correction for an error that occurred after the parameter table shown in FIG. 8C has been obtained, is modified.

DESCRIPTION OF THE PREFERRED EMBODIMENTS

The preferred embodiments of the present invention are described below with reference to the drawings. The same device and the like are denoted by the same reference numerals throughout the description and their descriptions are omitted. Although a magnetic disk is used as an example for convenience's sake, a storage device to which the present invention is applicable is not limited to this, as described later.

Figure 4:
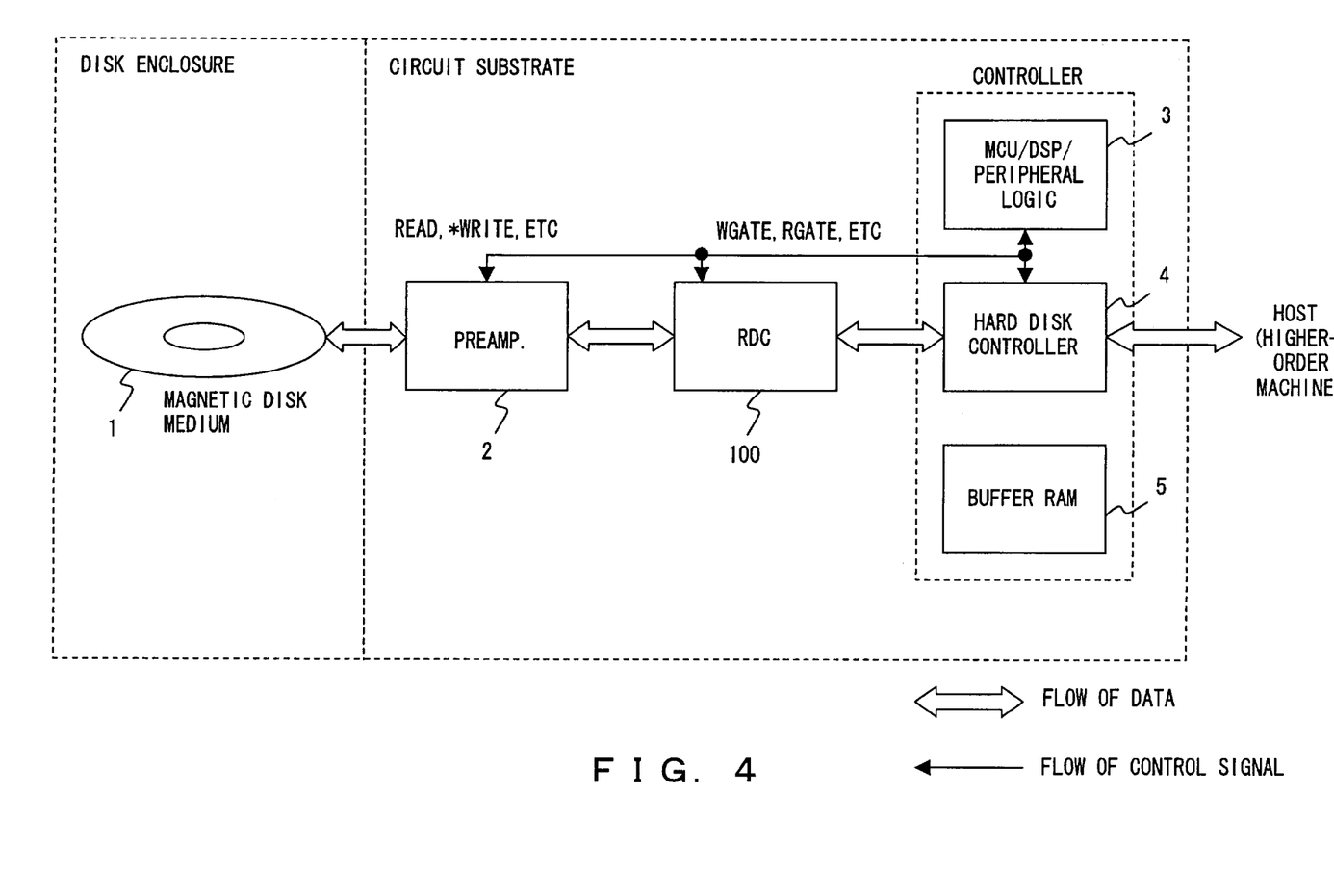
FIG. 4 shows the configuration of a magnetic disk device.

FIG. 4 shows the configuration of a magnetic disk device according to the present invention. In FIG. 4, thin and bold arrow marks indicate the flow of a control signal and that of data, respectively. As shown in FIG. 4, the magnetic disk device largely comprises a disk enclosure unit and a circuit substrate. The disk enclosure unit further comprises a magnetic disk medium 1 and a pre-amplifier 2. The circuit substrate further comprises an RDC 100, an MCU (micro controller unit)/DSP (digital signal processor)/peripheral logic 3, an HDC (hard disk controller) 4 and a buffer 5. In FIG. 4, a circuit recording data, a motor/driver and the like are not shown. The MCU/DSP/peripheral logic (hereinafter called an "MCU") 3, the HDC 4 and the buffer RAM (random access memory) 5 constitute a controller unit.

An analog signal that is read from the magnetic disk medium 1 using a read head, which is not shown in FIG. 4, is outputted to the preamplifier 1. The pre-amplifier 1 outputs the analog signal to the RDC 100. The RDC 100 demodulates the inputted analog signal and outputs the demodulated analog signal to the HDC 4. In this case, the RDC 100 makes a read circuit or a filer circuit that constitute the RDC 100 to adapt themselves to the change in environmental temperature or the output change of a read head, using the adaptation circuit described above. Since the RDC 100 has already been described, its detailed description is omitted.

The MCU 3 controls the entire magnetic disk device. For example, the MCU 3 controls the position of the head, initializes each circuit realizing the RDC 100 and the like. Since the MCU 3 is the same as a conventional one, its description is omitted.

The HDC 4 further comprises a buffer control circuit, an interface control circuit, a servo circuit and the like. The HDC 4 judges whether the demodulated digital data (read data) is accurately read. If data is accurately read, the HDC 4 transfers the read data to a host system (higher-order device), using the buffer RAM 5. If there is an error, the HDC 4 reads/writes data stored in the sector where the error is, based on a retrial table, which is not shown in FIG. 4, provided for the controller unit.

Figure 5:
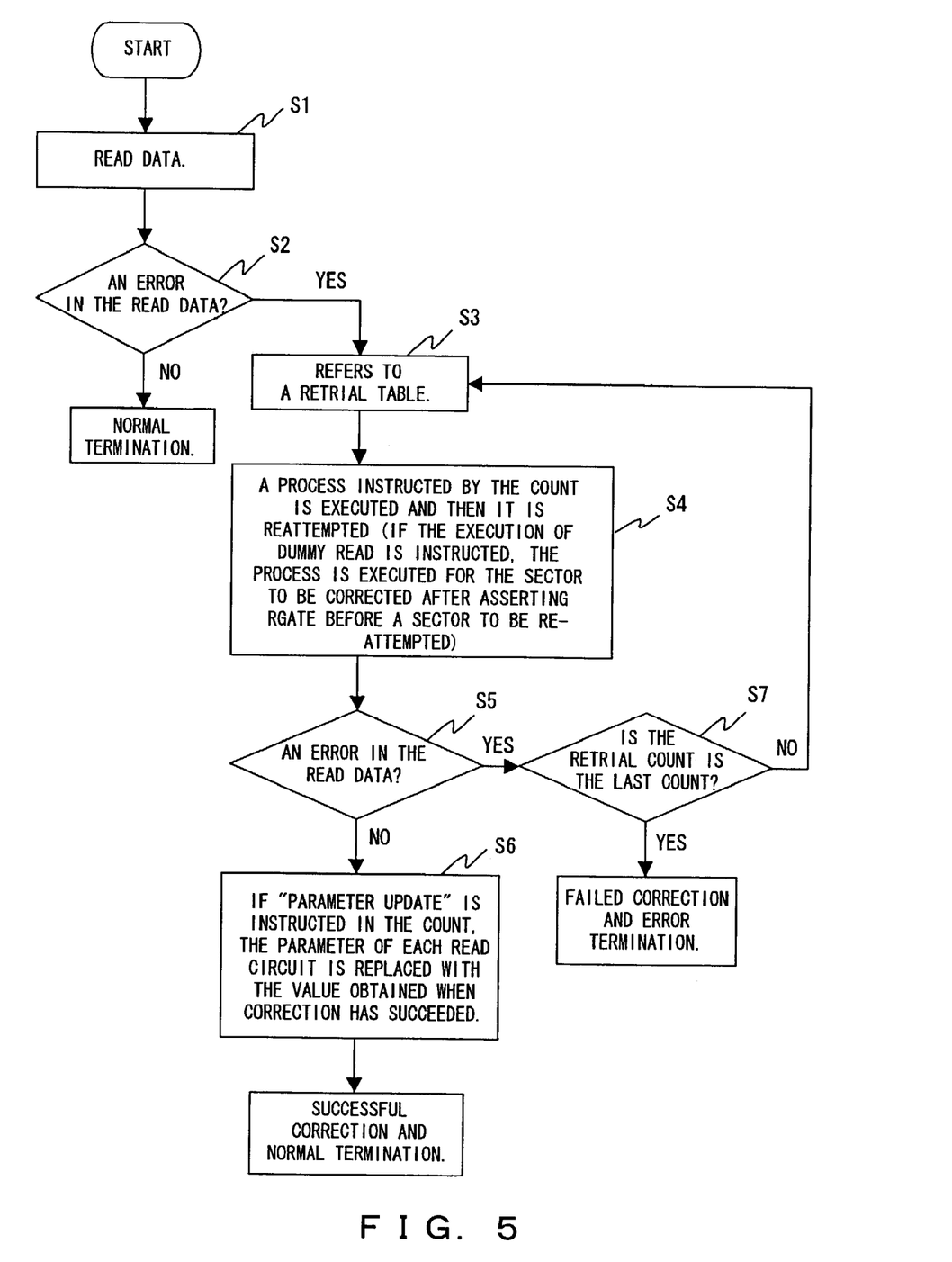
FIG. 5 is a flowchart showing a read retrial process.

Next, the read/write procedure of the preferred embodiment is described with reference to FIG. 5. Firstly, data is read from a sector of the magnetic disk medium 1 as a signal, according to instructions from the host system. The read signal is demodulated and is outputted to the HDC 4 (S1). The HDC 4 judges whether reading has accurately been conducted based on the demodulated data (S2). If the data is accurately read (no in S2), the HDC 4 temporarily stores the demodulated data in the buffer RAM 5 and simultaneously transfers it to the host system. Then, the HDC 4 accurately terminates the read process.

If the demodulated data is not accurately read (yes in S2), the HDC 4 refers to a retrial table (S3). The retrial table is provided, for example, on memory, such as a flash ROM attached to the controller unit (which is not shown in FIG. 4) and the like. On the retrial table, the error correction procedures that are followed when there is a read error, are described in relation to the number of retrials (hereinafter called "retrial count"). The HDC 4 obtains an error correction procedure corresponding to the current retrial count and corrects the error according to the obtained error correction procedure (S4).

The error correction procedures according to the present invention include two new procedures that are not included in the conventional error correction procedures. One is a dummy read (which is described later) and the other is a parameter update (which is described later). When the HDC 4 conducts a dummy read and/or parameter update, it must be instructed in advance to perform the dummy read and/or parameter update in a desired retrial count in the retrial table. If a dummy read is conducted, the instruction can also further include instructions to enable some adaptation circuit that constitutes the RDC 100.

If a procedure corresponding to the current retrial count includes a dummy read, the HDC 4 conducts a dummy read. The dummy read, outlined in the following procedures, is conducted while rotating the magnetic disk.

Firstly, in the dummy read, the HDC 4 instructs the pre-amplifier 2 to read data for another sector in the vicinity of the sector in which an error occurs, and further instructs the pre-amplifier 2 to assert the read gate of the RDC 100. For the sector in the vicinity of a sector in which an error occurs, a sector in the same zone or on the same track as that in which an error occurs is used. It is preferable for the sector in the vicinity of a sector in which an error occurs to be located, to be before the sector in which an error occurs, when seen from the rotation direction of the disk.

When the read gate is asserted, the RDC 100 enters into a read mode again. Therefore, the pre-amplifier 2 reads the data of a sector, which is the target of a dummy read, and outputs it to the RDC 100 as a signal. The RDC 100 demodulates the signal and simultaneously makes each of the parameters of adaptation circuits and read circuits that constitute the RDC to follow an optimal value as described earlier, using the signal. The signal read in the dummy read is outputted to the HDC 4 after being used to make each parameter of the units that constitute the RDC to follow an optimal value. However, the signal is not transferred from the HDC 4 to the host system.

The number of sectors to be dummy-read is determined based on its relationship with the follow-up time of a variety of read circuits and adaptation circuits that constitute the RDC 100. Generally, the greater the number of sectors to be dummy-read, the better. Therefore, as soon as they are ready to conduct dummy-read after an error has occurred, the dummy read of a sector in the vicinity of the sector in which an error has occurred is started. It is preferable to conduct the dummy read of a sector, following the sector whose dummy read has started until a read head rotates and reaches a position where the data of the sector, in which an error occurs, can be read. While the dummy read of the subsequent sector is conducted, the read gate is kept asserted.

When the read head reaches the position where the data of the sector in which an error occurs can be read, the HDC 4 reads/writes the sector as in the conventional case.

The causes of an error is classified into two groups; a group of causes that derive from the sector itself in which an error occurs, such as the damage of a magnetic disk medium, and a group of causes that do not derive from the sector itself in which an error occurs, rather, they derive from changes in environmental temperature and the degradation of a read head. In the case of the latter cause, even when the data of a sector in the vicinity of the sector in which an error occurs is read, there is a high possibility that another error occurs for the cause. Therefore, it can be considered that the data of a sector in the vicinity of the sector in which an error occurs can be used to adapt the parameter of each circuit that constitutes the RDC 100 to an optimal value. In the present invention, dummy read is conducted based on this concept.

Conventionally, since the parameter of each unit that constitutes the RDC 100 is adapted to the current optimal value using only the data of a sector in which an error occurs, the amount of change of a parameter that can be adapted during one rotation of a magnetic disk is small. Therefore, conventionally, if an error cannot be corrected after the parameter follow-up and read retrial of a sector in which an error occurs is conducted, the same process must be repeated after the magnetic disk medium 1 has rotated one or more times. Therefore, if the difference between the current optimal parameter value and a parameter actually set in each circuit is relatively big, a relatively long time is needed to correct the error since the number of rotations waiting of the magnetic disk medium 1 in error correction increases, which was a problem.

However, according to the present invention, a process of making a parameter follow an optimal value is performed in a dummy read before the parameter of each circuit that constitutes the RDC 100 is made to follow the current optimal value using the data of a sector in which an error occurs. In this case, while the magnetic disk medium 1 makes one rotation, the parameter of each circuit that constitutes the RDC 100 can be made to follow an optical value using the data of a plurality of sectors, increasing the amount of change of each parameter. In this way, even when the difference between a current optimal value and a parameter actually set in each circuit is relatively big, each parameter can be made to follow a current optimal value in a shorter time compared with the conventional case.

After S4, the HDC 4 judges whether there is an error in demodulated data that is read from a sector in which an error occurs (S5). If there is no error (no in S5), the HDC 4 transfers the demodulated data to the host system. Then, the HDC 4 judges whether the error correction procedures in the current retrial count obtained in S3 include a parameter update procedure updating a parameter registered in a parameter table. If the error correction procedures include a parameter update, the HDC 4 updates a parameter corresponding to a zone that includes a head used for reading and or a read sector in the parameter table, using the parameter that has been made to follow an optimal value at the time of error correction, and then accurately terminates the read process. If the error correction procedures do not include a parameter update, the HDC 4 normally terminates the read process without updating each parameter. The parameter table stores parameters used in each circuit that constitutes the RDC 100. The parameter table can be stored on memory, such as a flash ROM attached to the controller unit or the like, or can be written in an arbitrary part of the magnetic disk medium 1.

If an error is caused by the change in environmental temperature or the degradation of a head, the cause of the error seldom disappears rapidly. For example, if an error is caused by the change in environmental temperature, the environmental temperature seldom changes rapidly in a short time before the host system instructs a subsequent reading. For example, if an error is caused by the degradation of a head too, the head output can seldom be improved rapidly since the degradation of a head is semi-permanent. Therefore, if an error is caused by such a cause, there is a possibility that an error will occur even when data stored in a sector in the vicinity of a sector in which an error occurs, next time using the same head that has caused the read error. Therefore, by replacing a parameter registered in the parameter table with the parameter that has been made to follow an optimal value in order to correct the error, the possibility that an error occurs next time, and there after, can be reduced. Even when the cause of such an error disappears for some reason after updating the parameter, according to the preferred embodiment, such error correction can be rapidly carried out, giving no inconvenience to a user.

The parameter registered in the parameter table can be designed to return to a value set at the time of shipment from the updated value when the power of the host system is switched off or can be left at the updated value even after the power has been switched off.

If in S5 it is judged that there is an error in demodulated data read from the sector in which an error occurs (yes in S5), the HDC 4 increments a retrial count and further judges whether the retrial count has reached its retrial limit (S7).

If the retrial count has reached its retrial limit (yes in S7), the HDC 4 judges that the error correction of a sector has failed and terminates the read process. If the retrial count has not reached its retrial limit (No in S7), the process returns to S3.

Figure 6:
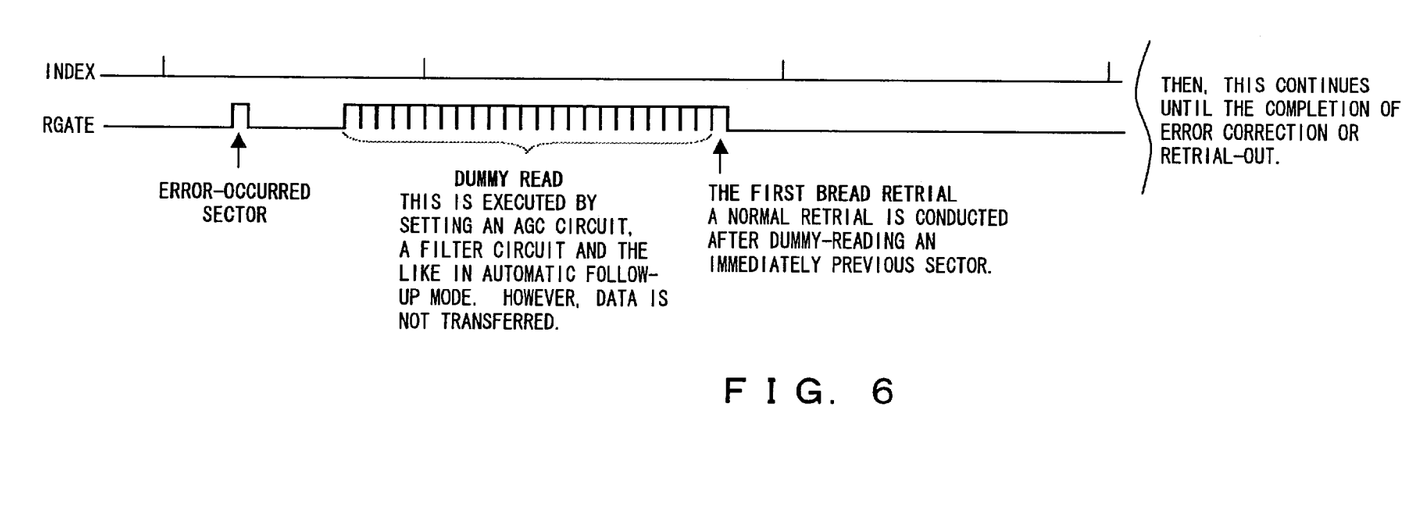
FIG. 6 shows how to correct an error according to the preferred embodiment.

The error correction method according to the preferred embodiment is described in detail below with reference to FIG. 6. In FIG. 6, the horizontal axis indicates the number of retrials. The upper section of FIG. 6 indicates an index pulse. An index pulse is outputted for each rotation and indicates the number of rotations of the disk. The lower section of FIG. 6 indicates the opening/closing of a read gate (RGATE).

As shown in FIG. 6, if the reading of information written in a specific sector fails, according to the preferred embodiment, the read gate is asserted when a read head is positioned in a sector located before the sector in which an error occurs, when seen from the rotation direction of the magnetic disk. Then, before the read head reaches the position where data stored in the sector in which the error occurs from the position where the read gate has been asserted, can be read, the adaptation circuit of the RDC 100 carries out the adaptation of circuits that constitute the RDC 100 using data read from a subsequent sector. In this case, the HDC 4 does not transfer the demodulated signal that is outputted from the RDC 100, to the host system. Then, the read retrial of the sector in which data failed to be read is carried out. In this retrial, the read data is transferred to the host system.

Specifically, prior to the retrial, the follow-up operation of a parameter used in each circuit that constitutes the RDC 100 is performed using data stored in a subsequent sector in the vicinity of the sector in which the error occurs. Then, in a read retrial, the follow-up operation and reading of the sector in which the error occurs is performed. In other words, while the magnetic disk makes one rotation, the follow-up operations of parameters for a plurality of sectors are performed.

Figure 7:
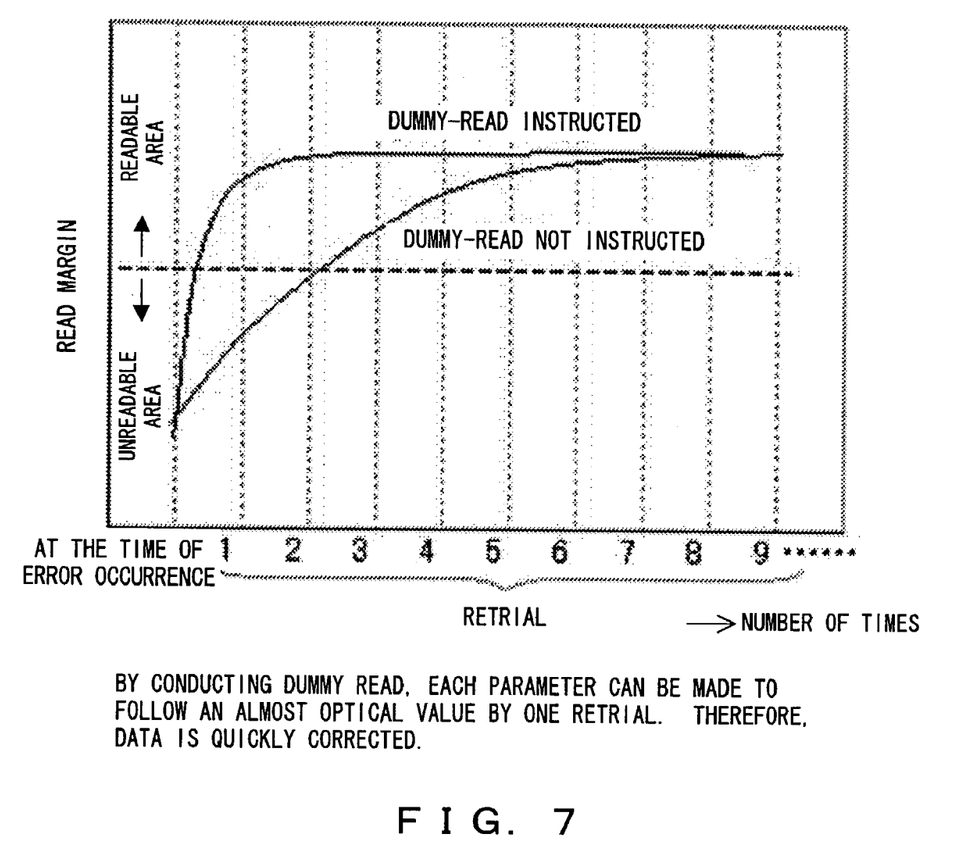
FIG. 7 shows respective time needed to correct an error conventionally and in the preferred embodiment.

Time needed to correct an error conventionally and in the preferred embodiment is described below with reference to FIG. 7. In FIG. 7, the horizontal and vertical axes indicate the number of retrials after an error has occurred and a read margin, respectively. The higher the margin, the lower the probability of error. A dotted line indicates a level whose probability of error is negligibly low. If the read margin goes beyond the dotted line, it means that error correction has been completed.

As shown in FIG. 7, conventionally, since the follow-up operation of a parameter is performed using only the data of one sector in which an error occurs in one read retrial, it takes some time for the read margin to reach the level indicated by the dotted line after the start of the retrial. However, according to the preferred embodiment, prior to a read retrial, the follow-up operation of a parameter is performed using data stored in another sector on the same track as the sector in which an error occurs, and then a read retrial is carried out as in the conventional case. In other words, the follow-up operations of parameters for a plurality of sectors can be performed by one retrial. Therefore, time needed for the parameter of a read circuit or a VGA gain to reach the level indicated by the dotted line is short compared with the conventional case without a dummy read. In FIG. 7, in the preferred embodiment and conventionally, after reaching a specific value through many retrials, the read margin does not further increase. This is because the parameter has reached an optimal value at that time.

Next, a procedure updating a parameter tuned at the time of shipment using a follow-up value is described in more detail with reference to FIGS. 8A through 8D.

FIGS. 8A through 8D show parameter tables indicating parameters set in a read circuit and a filter control circuit that constitute a read channel, at four different times. In each parameter table, a column and a row correspond to a data zone in a magnetic disk and a read head provided for the magnetic disk. A data zone is obtained by dividing the entire area of a magnetic disk into concentric circles radiating outward. The recording frequency of data varies with a data zone.

In FIGS. 8A through 8D, a value stored in a cell, whose row and column number are both 0, indicates parameter p00 set for a read head 0 and a data zone 0. In FIGS. 8A through 8D, although each cell indicates one parameter for conveniences' sake, in reality, a variety of parameters are set for each circuit of read circuits and filer control circuits or the like. The parameter table may be stored in memory, such as a flash ROM attached to the controller unit shown in FIG. 1 and the like, which is not shown in FIG. 1, or in a part of a magnetic disk medium 1.

FIG. 8A shows a parameter set at the time of shipment. It is assumed that an error occurs in a sector of a data zone 2 to be read by a read head 1. A parameter p12new that has been made to follow a current optimal value is obtained by an error correction process. By replacing the parameter p12 stored in a cell, whose row and column number is 1 and 2, respectively, with the parameter p12new, the parameter table shown in FIG. 8B can be obtained.

Here, it is assumed that at a specific time after the parameter shown in FIG. 8B has been obtained, another error further occurs in a specific sector in a data zone 5 to be read by a read head 0, and the error correction of the sector is attempted and fails. In this case, since a parameter p05 stored in a cell, whose row and column number is 0 and 5, respectively, of the parameter table shown in FIG. 8B, is not modified, the parameter table after the error correction shown in FIG. 8C is the same as the parameter table before the error correction shown in FIG. 8B.

Here, it is assumed that after some elapsed time, the parameter table shown in FIG. 8C has been obtained. This time another error occurs in a specific sector in a data zone 6 to be read by a read head 3, and a parameter p36new that has been made to follow a current optimal value is obtained by an error correction process. By replacing the parameter p36 stored in a cell, whose row and column number is 3 and 6, respectively, of the parameter table shown in FIG. 8C with the parameter p36new, the parameter table shown in FIG. 8D can be obtained.

In this way, by updating a parameter stored in a parameter table based on the result of error correction, the read error of data stored in the magnetic disk medium 1 can be greatly reduced.

The variations of the preferred embodiment are described below. So far the case where when there is a read error, each parameter is made to follow a current optimal value has been described. However, even when no error occurs, the storage device can also be configured in such a way that each parameter is made to follow an optimal value. In this case, for that purpose, the storage device shown in FIG. 4 must further comprise an environmental temperature detection unit detecting the change in environmental temperature and a read head output detection unit detecting the degradation of a read head. If the detection result of change in environmental temperature or the detection result of degradation of a read head meets prescribed conditions, S3 through S7 that have been described in FIG. 2 are executed when the host system firstly instructs the storage device to read data after the conditions have been met. In other words, by performing dummy-read of data in a sector other than the sector prior to the reading of a designated sector, each circuit that constitutes the RDC 100 can be adapted to the change in environmental temperature or the degradation of a read head. In this way, an error can be greatly reduced when reading a designated sector.

In the above description, a magnetic disk device is used as an example of the storage device. However, in the present invention, for a storage device other than a magnetic disk device, a magneto-optical disk device or an optical disk device, such as a CD (compact disk) or a DVD (digital versatile disk), or a magnetic tape and the like can also be used. In this case, the configuration of the read channel shown in FIG. 4 must be modified depending on the type of a storage medium. In the case of a CD and DVD, since there is only one track that spirals toward the center of a disk instead of a plurality of concentric circular tracks on a disk, a sector in the same zone as a sector in which an error occurs can also be used.

As described in detail above, according to the present invention, each circuit reading data can be adapted to the change in environmental temperature or the degradation of a read head, using data stored in a sector other than a sector in the storage device that the host system instructs to read data. In this way, the amount of change that a parameter can follow for each rotation of the storage device can be increased compared with the conventional case. As a result, the time needed for each circuit that constitutes a read channel to adapt itself to the change in environmental temperature or the degradation of a read head can be shortened.

According to the present invention, a setting value that is used in each circuit at the time of subsequent reading can be modified based on the result obtained when the circuit that constitutes a read channel is adapted to the change in environmental temperature or the degradation of a read head. In this way, an error can be greatly reduced when subsequent data is read.

While the invention has been described with reference to the preferred embodiments thereof, various modifications and changes may be made by those skilled in the art without departing from the true spirit and scope of the invention as defined by the claims thereof.

What is claimed is:

1. A read device reading data recorded on a storage medium, comprising:
   a read unit reading data stored in the storage medium; and
   a control unit controlling the read unit,
   said control unit controlling the read unit in such a way as to adapt a circuit that constitutes the read unit to a change in environmental temperature or degradation of a read head using data read from a second sector, instead of a first sector in the storage medium that a host system instructs to read data.

2. The read device according to claim 1, wherein
   the second sector is located in the vicinity of the first sector.

3. The read device according to claim 1, wherein
   said control unit does not transfer data read from the second sector to the host system.

4. The read device according to claim 1, wherein
   said control unit instructs the read unit to read the data recorded in the first sector after adapting a circuit that constitutes the read unit using data read from the second sector.

5. The read device according to claim 1, wherein
   the adaptation of a circuit that constitutes said read unit is conducted when the reading of data stored in the first sector fails.

6. The read device according to claim 1, further comprising
   a temperature detection unit detecting environmental temperature or a temperature in the device,
   wherein when said temperature detection unit detects a temperature change that meets prescribed conditions, said control unit adapts said circuit that constitutes said read unit to the change in environmental temperature before making said read unit read data stored in the first sector.

7. The read device according to claim 1, further comprising
a head output detection unit detecting an output of said read head that reads data from the storage medium,
wherein when said head output detection unit detects an output change that meets prescribed conditions, said control unit adapts said circuit that constitutes the read unit of the read head to the output change before instructing said read unit to read data stored in the first sector.

8. The read device according to claim 1, further comprising
a storage unit storing a setting value of each circuit that constitutes said read unit,
wherein said control unit updates the setting value stored in said storage unit, based on a result obtained by adapting the circuit that constitutes said read unit.

9. The read device according to claim 8, wherein
said storage unit is a part of the storage medium.

10. The read device according to claim 8, wherein
said storage unit is a memory comprised in the read device.

11. The read device according to claim 1, wherein
the storage medium is one of a magnetic disk, a magneto-optical disk or an optical disk.

12. A storage device, comprising:
a storage medium recording data;
a read unit reading data stored in the storage medium; and
a control unit controlling the read unit,
said control unit adapting each circuit that constitutes the read unit to the change in environmental temperature or degradation of read head, using data stored in a second sector instead of a first sector that a host system instructs to read data.

13. An adaptation method for adapting a read unit reading data recorded in a storage medium, comprising:

receiving an instruction to read data stored in a first sector in the storage medium from a host system; and
adapting a circuit that constitutes the read unit to a change in environmental temperature or degradation of a read head using data read from a second sector instead of the first sector before reading data from the first sector.

14. A circuit controlling a read device reading data recorded onto a storage medium, comprising:
a transfer unit transferring read data to a host system; and
a signal output unit outputting a signal asserting a read gate of a read unit reading data,
wherein when a read head is positioned in a location where data is stored in a second sector instead of a first sector in the storage medium that the host system instructs to read data, said signal output unit adapts a circuit that constitutes the read unit to a change in environmental temperature or degradation of a read head using data read from the second sector, and
said transfer unit does not transfer the data read from the second data to the host system.

15. A read device reading data recorded on a storage medium, comprising:
read means for reading data stored in the storage medium; and
control means for controlling the read means,
wherein said control means controls the read means in such a way as to adapt a circuit that constitutes the read means to a change in environmental temperature or degradation of a read head using data read from a second sector instead of a first sector in the storage medium that a host system instructs to read data.

* * * * *